United States Patent
Liu et al.

(10) Patent No.: US 7,142,761 B2
(45) Date of Patent: Nov. 28, 2006

(54) METHOD AND APPARATUS FOR ISOLATING AN ACTIVE REGION IN AN OPTICAL WAVEGUIDE

(75) Inventors: Ansheng Liu, Cupertino, CA (US); Mario J. Paniccia, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 10/731,559

(22) Filed: Dec. 9, 2003

(65) Prior Publication Data

US 2005/0123260 A1    Jun. 9, 2005

(51) Int. Cl.
*G02B 6/10* (2006.01)
(52) U.S. Cl. .......................................... 385/131; 385/14
(58) Field of Classification Search ........ 385/129–132, 385/14
See application file for complete search history.

(56) References Cited

U.S. PATENT DOCUMENTS

| | | | |
|---|---|---|---|
| 5,726,462 A * | 3/1998 | Spahn et al. .................. | 257/76 |
| 6,437,372 B1 * | 8/2002 | Geva et al. .................... | 257/94 |
| 6,895,134 B1 * | 5/2005 | Glogovsky et al. ........... | 385/14 |
| 6,905,924 B1 * | 6/2005 | Burbach et al. ............... | 438/237 |
| 2004/0258348 A1 * | 12/2004 | Deliwala ....................... | 385/14 |
| 2005/0025199 A1 * | 2/2005 | Ma ................................ | 372/20 |
| 2005/0031000 A1 * | 2/2005 | Botez ............................ | 372/47 |

OTHER PUBLICATIONS

Zhao, C.Z., et al., "Silicon-On-Insulator Asymmetric Optical Switch Based on Total Internal Reflection," *IEEE Photonics Technology Letters*, vol. 9, No. 8, (Aug. 1997), pp. 1113-1115.
Fischer, U., et al., "Integrated Optical Waveguide Switches in SOI," Proceedings 1995 IEEE International SOI Conference, (Oct. 1995), pp. 141-142.

* cited by examiner

*Primary Examiner*—Sung Pak
*Assistant Examiner*—Tina M. Wong
(74) *Attorney, Agent, or Firm*—Blakely, Sokoloff, Taylor & Zafman LLP

(57) ABSTRACT

An apparatus and method for modulating a phase of optical beam in an electrically isolated active region of an optical waveguide. In one embodiment, an apparatus according to embodiments of the present invention includes an active region of an optical waveguide disposed in a semiconductor layer. The active region includes a p doped region and an n doped region. The apparatus further includes an insulating region disposed in the semiconductor layer surrounding the active region in the semiconductor layer. The insulating region electrically isolates the active region of the optical waveguide from a passive region of the optical waveguide disposed in the semiconductor layer. An optical beam is to be directed through the optical waveguide and through the active region to be phase shifted in response to a modulated charge region in the active region in the optical waveguide.

28 Claims, 4 Drawing Sheets

METHOD AND APPARATUS FOR ISOLATING AN ACTIVE REGION IN AN OPTICAL WAVEGUIDE

BACKGROUND OF THE INVENTION

1. Field of the Invention

The present invention relates generally to optics and, more specifically, the present invention relates to modulating optical beams.

2. Background Information

The need for fast and efficient optical-based technologies is increasing as Internet data traffic growth rate is overtaking voice traffic pushing the need for optical communications. Transmission of multiple optical channels over the same fiber in the dense wavelength-division multiplexing (DWDM) systems and Gigabit (GB) Ethernet systems provide a simple way to use the unprecedented capacity (signal bandwidth) offered by fiber optics. Commonly used optical components in the system include wavelength division multiplexed (WDM) transmitters and receivers, optical filter such as diffraction gratings, thin-film filters, fiber Bragg gratings, arrayed-waveguide gratings, optical add/drop multiplexers, lasers and optical switches. Optical switches may be used to modulate optical beams. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally relies upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent material from ultraviolet to mid-infrared frequency range that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

Although the switching speeds of these types of devices are very fast, for example on the order of nanoseconds, one disadvantage with present day electro-optic switching devices is that these devices generally require relatively high voltages in order to switch optical beams. Consequently, the external circuits utilized to control present day electro-optical switches are usually specially fabricated to generate the high voltages and suffer from large amounts of power consumption. In addition, integration of these external high voltage control circuits with present day electro-optical switches is becoming an increasingly challenging task as device dimensions continue to scale down and circuit densities continue to increase.

BRIEF DESCRIPTION OF THE DRAWINGS

The present invention is illustrated by way of example and not limitation in the accompanying figures.

DETAILED DESCRIPTION

Figure 1:
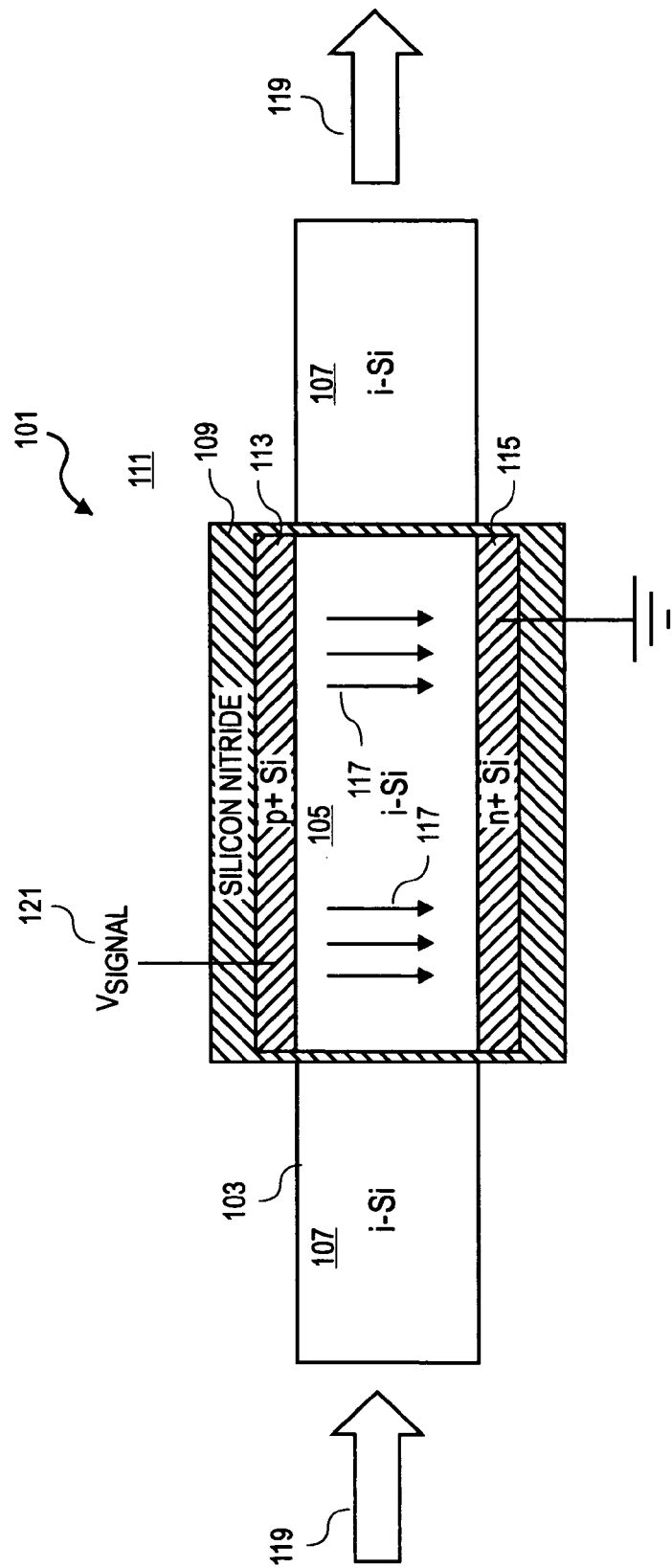
FIG. 1 is an illustration of one embodiment of an optical device including an optical waveguide including an active region electrically isolated from the passive regions in accordance with the teachings of the present invention.

Methods and apparatuses for phase shifting an optical beam in an optical waveguide having an active region electrically isolated from passive regions of the optical waveguide are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. In addition, it is appreciated that the figures provided herewith are for explanation purposes to persons ordinarily skilled in the art and that the drawings are not necessarily drawn to scale.

In one embodiment of the present invention, a semiconductor-based optical device is provided in a fully integrated solution on a single integrated circuit chip. One embodiment of the presently described optical device includes a semiconductor-based waveguide having a p-n junction structure or a p-i-n structure, or the like, adapted to modulate a charge concentration along an optical path to phase shift an optical beam in response to a signal. In one embodiment, the charge modulation is to occur with current injection in the active region in an optical waveguide along an optical path through the optical waveguide. An optical beam is to be directed through the waveguide and through the charge modulated region in the active region of the optical waveguide to phase shift the optical beam.

Without electrically isolating the active region from the passive region of the optical waveguide, injected current leaks into what otherwise should be passive regions outside the optical path of an optical beam directed through the optical waveguide. As will be discussed, since the refractive index change in for example silicon is proportional to the current density change, the phase shift due to current injection is smaller for a given bias voltage if there is current leakage outside the optical path or there is current leakage into an area in which there is no optical mode. Simulations also show that the switching speed of the current injection is reduced as well by current leakage.

In one embodiment, the efficiency of current injection for a given bias voltage is increased and the switching time of current injection occurring in the active region is reduced by electrically isolating the active region of the optical waveguide from the passage region of the optical waveguide in accordance with the teachings of the present invention. By electrically isolating the active region from the passive region, current leakage in the optical waveguide is reduced in accordance with the teachings of the present invention. Embodiments of the disclosed optical devices can be used in a variety of high bandwidth applications including multiprocessor, telecommunications, networking as well as other high speed optical applications such as optical delay lines, switches, modulators, add/drops, or the like.

To illustrate, FIG. 1 is a cross-section illustrating generally one embodiment of an optical device 101 including an optical waveguide 103 disposed in semiconductor material 111. In one embodiment, the core of optical waveguide 103 disposed in semiconductor material 111 includes intrinsic silicon. As shown in the depicted embodiment, optical waveguide 103 includes an active region 105 that is electrically isolated from the passive regions 107 of the optical waveguide 103. In one embodiment, optical device 101 includes an insulating region 109 disposed in the semiconductor material 111 to electrically isolate the active region 105 from the passive regions 107 of optical waveguide 103. In one embodiment, insulating region 109 includes silicon nitride.

As shown in the embodiment of FIG. 1, active region 105 includes a doped region 113 having a first conductivity type and a doped region 115 having a second conductivity type. In one embodiment, doped region 113 includes p-type dopants and doped region 115 includes n-type dopants. It is appreciated that the polarities of the dopants are provided and illustrated in FIG. 1 are explanation purposes and that the polarities of the dopants and corresponding voltages may be reversed in accordance with the teachings of the present invention. During operation, an optical beam 119 is directed through optical waveguide 103 through passive regions 107 and active region 105. In one embodiment, doped region 113 and doped region 115 are biased in response to a signal 121, illustrated as $V_{SIGNAL}$, to inject a current 117 through the active region 105 of optical waveguide 103. In one embodiment, the injected current 117 is along an optical path of optical beam 119 through active region 105. With the current 117 injected along the optical path of optical beam 119 in response to signal 121, optical beam 119 is propagated through a modulated charge region provided by injected current 117 in active region 105.

In the embodiment illustrated, it is appreciated that an intrinsic silicon region of optical waveguide 103 is illustrated in active region 105 between doped regions 113 and 115. In another embodiment, it is appreciated that this region between doped regions 113 and 115 could also be very lightly doped. As such, a p-i-n diode structure is provided in the illustrated embodiment, with the modulated charge region provided by injected current 117 in the intrinsic silicon, which is also along the optical path of optical beam 119. In another embodiment, it is appreciated that a p-n junction diode structure could also be employed with the charge modulated region provided by injected current 117 along the p-n junction, though which optical beam 119 is directed in accordance with the teachings of the present invention. Depending on how the p-n junction is biased, the concentration of charge carriers in the modulated charge region are modulated in response to signal 121 in accordance with the teachings of the present invention. For instance, in one embodiment, the p-n junction may be forward biased or reverse biased as desired in response to signal 121 to modulate the concentration of charge carriers in modulated charge region in accordance with the teachings of the present invention.

In operation, optical beam 119 is directed through optical waveguide 103 along an optical path through the modulated charge region provided by injected current 117. Signal 121 is applied to modulate the free charge carrier concentration in the active region 105 at the modulated charge region provided by injected current 117. Therefore, the applied voltage from signal 121 changes the free charge carrier density or concentration in the charge modulated region, which results in a change in the refractive index of the semiconductor material in the active region 105 of optical waveguide 103.

In one embodiment, the free charge carriers in the modulated charge region in the active region 105 may include for example electrons, holes or a combination thereof. In one embodiment, the free charge carriers may attenuate optical beam 119 when passing through. In particular, the free charge carriers in the modulated charge region in the active region 105 may attenuate optical beam 119 by converting some of the energy of optical beam 119 into free charge carrier energy. Accordingly, the absence or presence of free charge carriers in modulated charge region in the active region 105 will modulate optical beam 119 in accordance with the teachings of the present invention.

In one embodiment, the phase of optical beam 119 that passes through modulated charge region in the active region 105 is modulated in response to signal 121. In one embodiment, the phase of optical beam 119 passing through free charge carriers in the modulated charge region, or the absence of free charge carriers, is modulated due to the plasma optical effect. The plasma optical effect arises due to an interaction between the optical electric field vector and free charge carriers that may be present along the optical path of the optical beam 119 in optical waveguide 103. The electric field of the optical beam 119 polarizes the free charge carriers and this effectively perturbs the local dielectric constant of the medium. This in turn leads to a perturbation of the propagation velocity of the optical wave and hence the index of refraction for the light, since the index of refraction is simply the ratio of the speed of the light in vacuum to that in the medium. Therefore, the index of refraction in optical waveguide 103 of optical device 101 is modulated in response to the modulation of free charge carriers in the modulated charge region in active region 105. The modulated index of refraction in the waveguide of optical device 101 correspondingly modulates the phase of optical beam 119 propagating through optical waveguide 103 of optical device 101. In addition, the free charge carriers in the modulated charge region in active region 105 are accelerated by the field and lead to absorption of the optical field as optical energy is used up. Generally the refractive index perturbation is a complex number with the real part being that part which causes the velocity change and the imaginary part being related to the free charge carrier absorption. The amount of phase shift $\phi$ is given by $$\phi = (2\pi/\lambda)\Delta nL \qquad \text{(Equation 1)}$$

with the optical wavelength $\lambda$, the refractive index change $\Delta n$ and the interaction length L. In the case of the plasma optical effect in silicon, the refractive index change $\Delta n$ due to the electron ($\Delta N_e$) and hole ($\Delta N_h$) concentration change is given by:

$$\Delta n = -\frac{e^2\lambda^2}{8\pi^2 c^2 \varepsilon_0 n_0}\left(\frac{b_e(\Delta N_e)^{1.05}}{m_e^*} + \frac{b_h(\Delta N_h)^{0.8}}{m_h^*}\right) \qquad \text{(Equation 2)}$$

where $n_o$ is the nominal index of refraction for silicon, e is the electronic charge, c is the speed of light, $\varepsilon_0$ is the permittivity of free space, $m_e^*$ and $m_h^*$ are the electron and hole effective masses, respectively, $b_e$ and $b_h$ are fitting parameters.

Referring back to the embodiment illustrated in FIG. 1, insulating region 109 electrically insulates active region 105 from passive regions 107 to reduce or minimize current leakage of injected current 117 into regions outside the optical path of optical beam 119 or outside of active region 105 in accordance with the teachings of the present invention. It is appreciated that without insulating region 109, current leakage would exist in the areas outside the doped regions 113 and 115 outside the optical path of optical beam 119. Since the refractive index change in silicon is proportional to the carrier density or concentration change, the phase shift due to the injection of current 117 would be smaller for a given bias voltage if there is current leakage outside the optical path or the area in which there is no optical mode of optical beam 119.

Indeed, it is appreciated that the switching speed of injected current 117 is reduced as well by the leakage of current 117 into regions outside the optical path of optical beam 119 in accordance with the teachings of the present invention. For instance, a rise time of approximately 19 nanoseconds from 10% to 90% is provided with one embodiment of optical device 101 compared to a rise time of approximately 58 nanoseconds for an embodiment in which there is substantially no electrical isolation provided near the doped regions 113 and 115. Thus, it is appreciated that a nearly 3× improvement in speed is obtained by electrically isolating the active region 105 from the passive regions 107 in accordance with the teachings of the present invention.

Therefore, in the embodiment shown in FIG. 1, insulating region 109 substantially isolates injected current 117 is to exist along the optical path of optical beam 119 in the intrinsic silicon region between doped regions 113 and 115. As shown in FIG. 1, doped regions 113 and 115 are substantially adjoining insulating region 109 and there is substantially no intrinsic silicon disposed between insulating region 109 and doped region 113 or 115. As a result, substantially all of the modulated charge region provided by injected current 117 is along the optical path of optical beam 119 in accordance with the teachings of the present invention.

In one embodiment, insulating region 109 is formed with a silicon nitride trench around and defining active region 105. In one embodiment, insulating region 109 has a rectangular shape intersecting optical waveguide 103, as illustrated in FIG. 1. In one embodiment, the trench width or gap width of the insulating region 109 at the interface between the active region 105 and passive regions 107 is chosen in order to have a relatively small transmission loss due to reflection and scattering of optical beam 119 when propagated into and out of active region 105 through insulating region 109. For example, in one embodiment, optical beam 119 exhibits only a small optical loss of approximately 0.25 dB when propagated through insulating region 109, with the core material of optical waveguide 103 including silicon and insulating region 109 including silicon nitride. In one embodiment, the gap width of insulating region 109 along the sides of optical waveguide 103 may be arbitrarily chosen since optical beam 103 is not directed through these portions of the insulating region 109. It is appreciated that other materials, such as for example oxide, $SiO_2$ or air could be used for insulating region 109, but these materials result in optical beam suffering more optical loss when the core material of optical waveguide 103 includes silicon.

Figure 2:
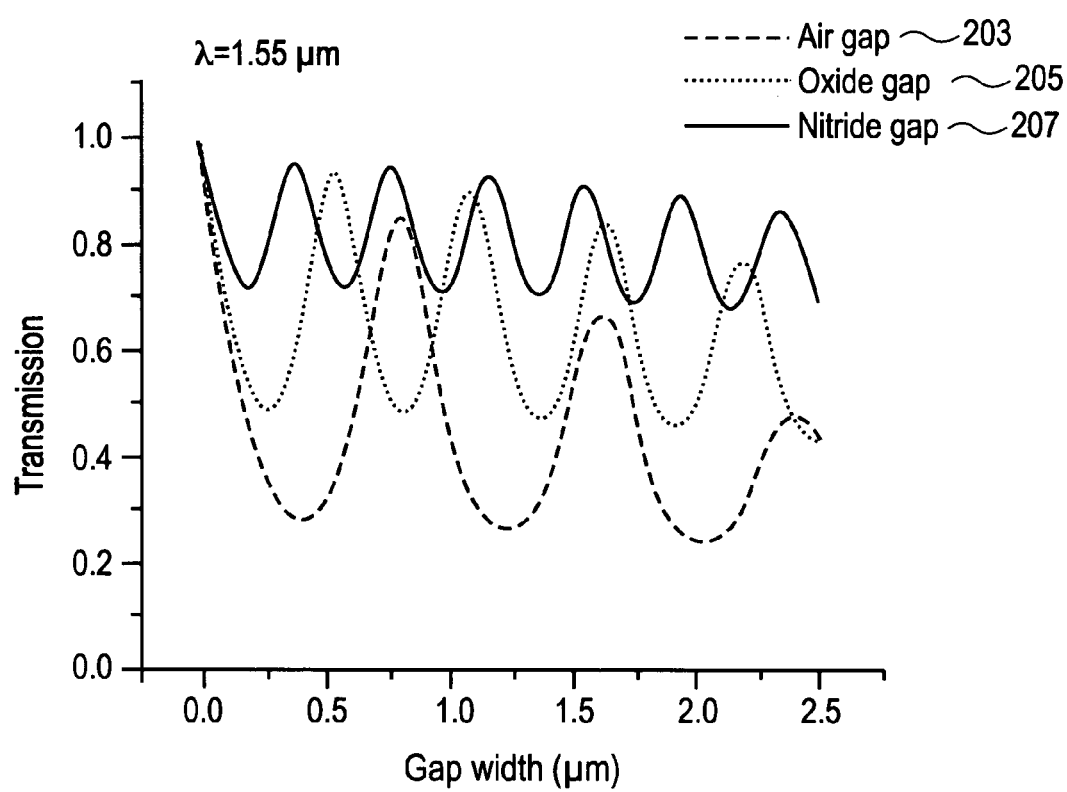
FIG. 2 is a plot illustrating a relationship between the optical transmission coefficient and the gap width of insulating layers of an optical waveguide according to one embodiment of an optical device in accordance with the teachings of the present invention.

To illustrate, FIG. 2 is a graph 201 illustrating generally a relationship between the optical transmission coefficient of optical beam 119 and the gap width of insulating region 109 between active region 105 and passive regions 107 according to one embodiment of an optical device in accordance with the teachings of the present invention. In graph 201, it is assumed that the optical beam 119 has a wavelength of $\lambda=1.55$ μm. In addition, optical waveguide 103 is assumed to be a silicon rib waveguide having a width of approximately 2 μm, a total height of approximately 4 μm, and a slab height of approximately 1.5 μm. As shown in graph 201, the optical transmission of coefficient of optical waveguide 103 for three different materials used for insulating region 109 are compared with respect to varying gap widths. In particular, plot 203 illustrates the optical transmission coefficient using air for insulating region 109, plot 205 illustrates the optical transmission coefficient using oxide for insulating region 109 and plot 207 illustrates the optical transmission coefficient using silicon nitride for insulating region 109.

As can be appreciated from FIG. 2, an air gap or an oxide gap has a greater optical loss or less optical transmission when compared to a silicon nitride gap for insulating region 109. Therefore, in one embodiment, silicon nitride having a gap width of approximately 0.4 μm is chosen for one embodiment of optical waveguide 103, which is where there is a peak in the optical transmission coefficient of plot 207. It is noted that there is a damped oscillation in the transmission versus the gap width for a given wavelength for all three materials used for insulating region 109. The oscillatory behavior is due to the Fabry-Perot effect. The gradual decrease in the maximum transmission is due to the fact that there is a slight divergence of the optical beam in the insulating region 109 so that there is a mode size mismatch between the guided mode and the optical beam in the insulating region.

Figure 3:
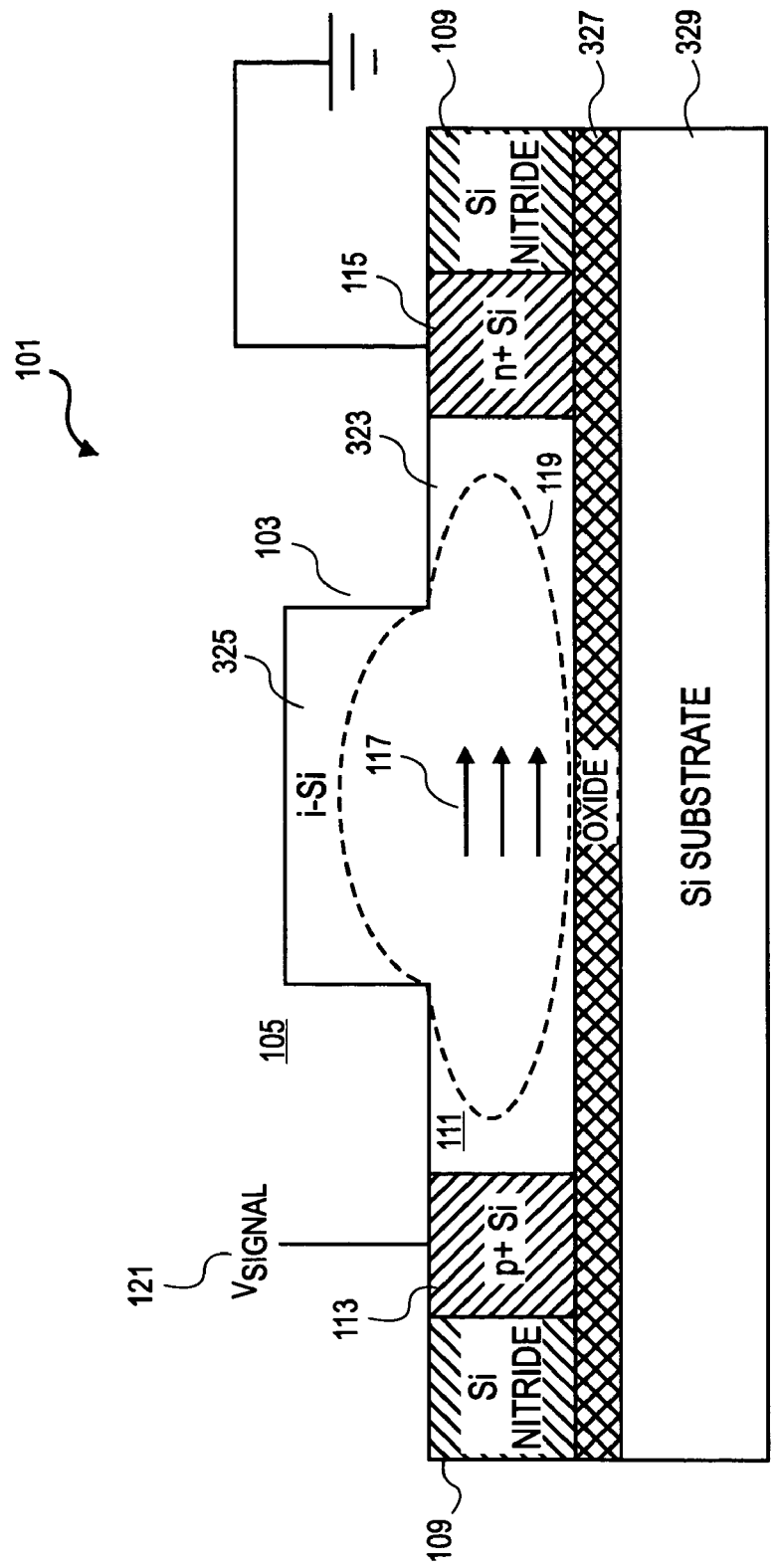
FIG. 3 is a cross-section illustration through one embodiment of an active region of an optical waveguide including an insulating region electrically isolating the active region from the passive region in accordance with the teachings of the present invention.

FIG. 3 is a cross-section illustration through the active region 105 of the optical waveguide 103 according to an embodiment of the present invention. As shown in the depicted embodiment, optical device 101 includes optical waveguide 103 disposed in semiconductor material 111. In one embodiment, the semiconductor material 111 is included in the epitaxial silicon layer of a silicon-on-insulator (SOI) wafer. As such, optical device 101 further includes a buried insulating layer 327 disposed between the semiconductor material 111 and a semiconductor material layer 329. In one embodiment semiconductor material layer 329 is the silicon substrate layer of the SOI wafer.

As can be observed in the embodiment of FIG. 3, optical waveguide 103 is a rib waveguide through which optical beam 119 is directed along an optical path. In the embodiment illustrated in FIG. 3, optical waveguide 103 includes a rib region 325 and a slab region 323. In one embodiment, optical beam 119 includes infrared or near infrared light. For example, in one embodiment, optical beam 119 has a wavelength near approximately 1.3 μm or 1.55 μm. In the embodiment illustrated in FIG. 3, the optical path along which optical beam 119 is directed is along an axis that parallel to the axis of the optical waveguide 103. In the example shown in FIG. 3, the optical path and therefore optical beam 119 are shown to propagate along a direction going through, or coming in and out of, the page.

As shown in the embodiment of FIG. 3, doped region 115 is grounded and doped region 113 is coupled to receive signal 121, shown as $V_{SIGNAL}$, to inject current 117 through the active region 105 of optical waveguide 103. As shown, the injected current 117 is along an optical path of optical beam 119 through active region 105. With the current 117 injected along the optical path of optical beam 119 in response to signal 121, optical beam 119 is propagated through a modulated charge region provided by injected current 117 in active region 105. FIG. 3 also shows that insulating region 109 is disposed outside active region 105 to electrically isolate active region 105. As such, injected current 117 is substantially isolated to exist in active region 105 between doped regions 113 and 115 through the optical path of optical beam 119. Leakage of injected current 117 into areas outside the optical path of optical beam 119 is therefore reduced, which improves the efficiency of the injection of current 117 for a given bias voltage and the switching speed of the current injection is improved in accordance with the teachings of the present invention.

The embodiment illustrated in FIG. 3 shows that doped regions 113 and 115 are disposed in the slab region 323 of optical waveguide 103 outside the optical path of optical 119. Since the doped regions 113 and 115, and therefore also the metal contacts coupled to doped regions 113 and 115, are located outside the optical mode of optical beam 119, any loss due to the doped semiconductor and metal is very small in accordance with the teachings of the present invention. In the illustrated embodiment, the semiconductor material between doped regions 113 and 115 is very lightly doped such that optical loss in optical beam 119 is reduced.

In one embodiment, the rib region 325 of optical waveguide 103 is approximately 2 μm in width, the etch depth or the height of the rib region 325 is approximately 2.5 μm and height of optical waveguide 103 is 4 μm. In addition, the edges of the doped regions 113 and 115 are approximately 2 μm away from the edge of the rib region 325. Of course, the dimensions of the illustrated embodiment are provided for explanation purposes only and other embodiments having other dimensions may be employed in accordance with the teachings of the present invention.

Figure 4:
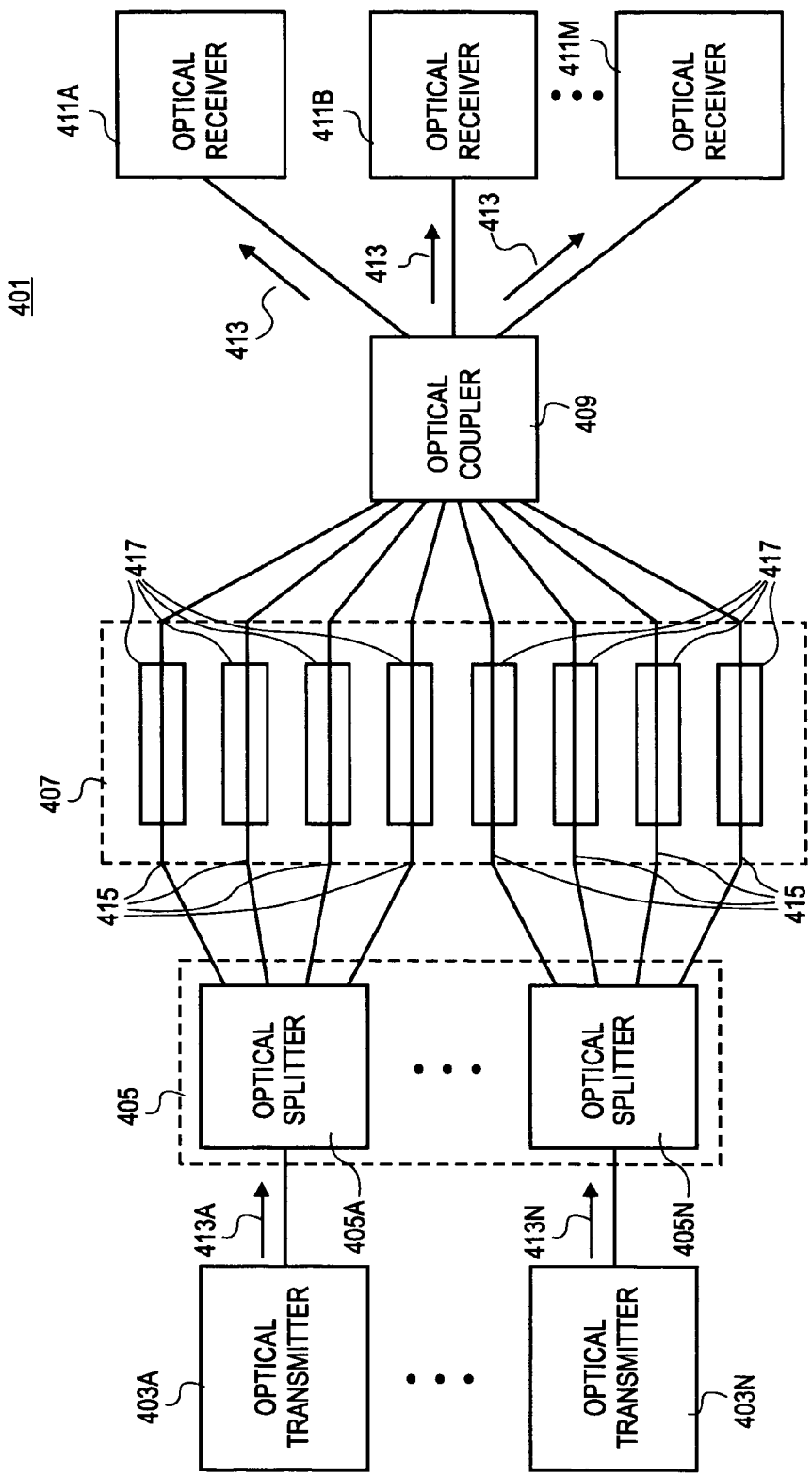
FIG. 4 is a block diagram illustration of one embodiment of a system including at least one optical transmitter and at least one optical receiver with an optical device including at least one optical waveguide having an active region electrically isolated from the passive regions in accordance with the teachings of the present invention.

FIG. 4 is a block diagram illustrating generally one embodiment of a system including at least one optical transmitter and at least one optical receiver with an optical device including at least optical waveguide having an active region electrically isolated from the passive regions in accordance with the teachings of the present invention. In particular, FIG. 4 shows optical system 401 including at least one optical transmitter 403A and at least one optical receiver 411A with an optical device 407 optically coupled between optical transmitter 403A and optical receiver 411A. The example embodiment of FIG. 4 shows that system 401 may also include additional optical transmitters, such as optical transmitter 403N and additional optical receivers, such as optical receivers 411B and 411M. It is appreciated that other embodiments may have a different number of optical transmitters and receivers. In the example illustrated in FIG. 4, it may be assumed that there are N optical transmitters and M optical receivers, where N and M are integer values greater than or equal to one.

In the illustrated embodiment, system 401 also includes an optical splitter 405 optically coupled between optical device 407 and optical transmitters 403A through 403N. In particular, optical splitter 405 is shown to include a component optical splitters 405A through 405N coupled to receive optical beams 413A through 413N from optical transmitters 403A through 403N. Optical splitters 405A through 405N split the optical beams 413A through 413N into a plurality of respective optical beams, each of which are directed into separate optical waveguides 415 included in optical device 407. In one embodiment, each of the optical waveguides 415 included in optical device 407 includes a respective insulating region 417, which electrically isolates active regions included in each of the plurality of optical waveguides 415 from passive regions included in each of the plurality of optical waveguides 415.

In one embodiment, each of the optical waveguides 415 in optical device 407 is substantially similar to optical waveguide 103 discussed above with respect to FIGS. 1–3. Accordingly, each of the insulating regions 417 is substantially similar to the insulating regions 109 discussed above with respect to FIGS. 1–3. As such each of the plurality of respective optical beams received from optical splitter 405 is phase shifted in each respective active region electrically isolated by insulating regions 417 in accordance with the teachings of the present invention. In one embodiment, it is appreciated that increased thermal isolation may be provided between each of the plurality of optical waveguides since insulating regions 417 may provide increased thermal insulation when compared to semiconductor material. For example, silicon nitride has less thermal conductivity compared to silicon.

In one embodiment, each of the phase shifted plurality of respective optical beams directed through each of the plurality of optical waveguides 415 is then directed to optical coupler 409. In one embodiment, optical coupler 409 combines each of the phase shifted plurality of respective optical beams such that constructive and destructive interference occurs between the received optical beams. By controlling the constructive and destructive interference, the combined optical beams can be modulated or selectively directed to any one or more of the optical receivers 411A through 411M in accordance with the teachings of the present invention. Therefore, in one embodiment, an N×M optical switch is realized with system 401 in accordance with the teachings of the present invention.

In one embodiment of the present invention, it is noted that various elements of system 401 may be fabricated onto a single integrated circuit chip. Therefore, it is appreciated that system 401 may be provided in a fully integrated solution on a single integrated circuit chip. For example, optical splitter 405, optical device 407 and optical coupler 409 may be implemented on a single integrated circuit chip in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   an active region of an optical waveguide disposed in a semiconductor layer, the active region including a p doped region and an n doped region; and
   an insulating region disposed in the semiconductor layer surrounding the active region in the semiconductor layer, the insulating region electrically isolating the active region of the optical waveguide from a passive region of the optical waveguide disposed in the semiconductor layer, the passive region of the optical waveguide optically coupled to the active region of the optical waveguide through a portion of the insulating region to pass an optical signal, wherein the active region includes a region to modulate charge in the optical waveguide to phase shift the optical signal when passed through the active region.

2. The apparatus of claim 1 wherein the active region further comprises an intrinsic region of semiconductor material adjoining and disposed between the p doped and n doped regions.

3. The apparatus of claim 1 wherein substantially all of the region to modulate charge in the active region is along an optical path of the optical beam.

4. The apparatus of claim 1 wherein the p doped and n doped regions are substantially adjoining the insulating region.

5. The apparatus of claim 2 wherein substantially none of the intrinsic region of the semiconductor material is disposed between the insulating region and the p doped or n doped regions.

6. The apparatus of claim 2 wherein the p doped, intrinsic and n doped regions are included in a p-i-n diode included in the active region.

7. The apparatus of claim 2 wherein the p doped and n doped regions disposed outside an optical path of the optical beam through the active region.

8. The apparatus of claim 7 wherein the optical waveguide comprises a rib waveguide having a rib portion and a slab portion, wherein the p doped and n doped regions are disposed at opposite ends of the slab portion outside the optical path of the optical beam through the active region.

9. The apparatus of claim 1 wherein the insulating region surrounding the active region comprises one of silicon nitride, oxide, SiO2 or air.

10. The apparatus of claim 1 wherein the semiconductor layer comprises silicon.

11. The apparatus of claim 1 wherein the region to modulate charge in the optical waveguide is coupled to be modulated in response to current injection in the active region between the p doped and n doped regions.

12. A method, comprising:
    directing an optical beam through a first passive region of an optical waveguide disposed in a semiconductor layer;
    directing the optical beam from the first passive region through an insulating region disposed in the semiconductor layer into an active region of the optical waveguide, the insulating region surrounding the active region;
    phase shifting the optical beam in response to a charge modulated region disposed in the active region of the optical waveguide; and
    directing the optical beam from the active region through the insulating region into a second passive region of the optical waveguide, the active region electrically isolated from the first and second passive regions of the optical waveguide.

13. The method of claim 12 wherein phase shifting the optical beam comprises modulating a charge modulated region disposed in the active region in the semiconductor layer.

14. The method of claim 13 further comprising confining with the insulating region substantially all of the charge modulated region in the active region to be along an optical path of the optical beam through the active region.

15. The method of claim 13 wherein modulating the charge modulated region comprises injecting current in the active region between p doped and n doped regions disposed in the active region in the semiconductor layer.

16. The method of claim 15 further comprising reducing with the insulating region current leakage of the injected current outside an optical path of the optical beam through the active region.

17. The method of claim 15 wherein phase shifting the optical beam comprises directing the optical beam through an intrinsic region of semiconductor material in the semiconductor layer adjoining and disposed between the p doped and n doped regions.

18. The method of claim 17 wherein directing the optical beam through the intrinsic region comprises directing the optical beam along an optical path through the active region outside of the p doped and n doped regions.

19. A system, comprising:
    an optical transmitter to transmit an optical beam;
    an optical receiver; and
    an optical device optically coupled between the optical transmitter and optical receiver, the optical device including an optical waveguide disposed in a semiconductor layer, the optical waveguide including:
      an active region of the optical waveguide disposed in a semiconductor layer, the active region including a p doped region and an n doped region; and
      an insulating region disposed in the semiconductor layer surrounding the active region in the semiconductor layer, the insulating region electrically isolating the active region of the optical waveguide from a passive region of the optical waveguide disposed in the semiconductor layer, the passive region of the optical waveguide optically coupled to the active region of the optical waveguide through a portion of the insulating region to pass the optical beam, wherein the active region includes a region to modulate charge in the optical waveguide to phase shift the optical signal when passed through the active region, wherein the optical receiver is coupled to receive the phase shifted optical beam from the optical device.

20. The system of claim 19 wherein the active region further comprises an intrinsic region of semiconductor material adjoining and disposed between the p doped and n doped regions.

21. The system of claim 19 wherein the p doped and n doped regions are substantially adjoining the insulating region.

22. The system of claim 20 wherein substantially none of the intrinsic region of the semiconductor material is disposed between the insulating region and the p doped or n doped regions.

23. The system of claim 20 wherein the p doped and n doped regions disposed outside an optical path of the optical beam through the active region.

24. The system of claim 19 further comprising an optical splitter coupled between the optical transmitter and the optical device, the optical splitter coupled to receive the optical beam and split the optical beam into a plurality of optical beams output from the optical splitter, wherein the optical beam received by the optical device is one of the plurality of optical beams output from the optical splitter.

25. The system of claim 24 wherein the optical waveguide is one of a plurality of optical waveguides disposed in the semiconductor layer, wherein each of the plurality of waveguides is substantially similar to one another, wherein each of the plurality of waveguides is coupled to the optical splitter to receive a respective one of the plurality of optical beams output from the optical splitter.

26. The system of claim 25 further comprising an optical coupler coupled between the plurality of waveguides and the optical receiver, the optical coupler to receive the plurality of optical beams output from the optical splitter through the plurality of waveguides, the optical coupler to combine the plurality of optical beams output from the optical splitter and selectively direct the optical beam to the optical receiver.

27. The system of claim 26 wherein the optical receiver is one of a plurality of optical receivers optically coupled to the optical coupler, wherein each of the plurality of optical beams is selective coupled to receive the optical beam from the optical coupler.

28. The system of claim 26 wherein the optical transmitter is one of a plurality of optical transmitters, each of the plurality of optical transmitters to transmit a respective optical beam, each respective optical beam to be split by the optical splitter into a plurality of optical beams to be directed through the plurality of waveguides.

* * * * *